(12) United States Patent
Callicoat et al.

(10) Patent No.: US 10,611,264 B2
(45) Date of Patent: Apr. 7, 2020

(54) ELECTRIFIED VEHICLE BUSBAR ASSEMBLY

(71) Applicant: FORD GLOBAL TECHNOLOGIES, LLC, Dearborn, MI (US)

(72) Inventors: Debbi Callicoat, Livonia, MI (US); Brian Utley, Canton, MI (US); Vedat Haydin, Canton, MI (US); Francisco Fernandez, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 952 days.

(21) Appl. No.: 14/664,981

(22) Filed: Mar. 23, 2015

(65) Prior Publication Data

US 2016/0280088 A1    Sep. 29, 2016

(51) Int. Cl.
*H02J 7/00* (2006.01)
*B60L 50/64* (2019.01)
*B60L 58/26* (2019.01)

(52) U.S. Cl.
CPC .............. *B60L 50/64* (2019.02); *B60L 58/26* (2019.02); *Y02T 10/7005* (2013.01); *Y02T 10/705* (2013.01)

(58) Field of Classification Search
USPC ........................................................ 320/109
See application file for complete search history.

(56) References Cited

U.S. PATENT DOCUMENTS

| 1,410,716 | A | 3/1922 | Peers | |
| 6,097,173 | A | 8/2000 | Bryant, Jr. | |
| 8,420,250 | B2 | 4/2013 | Kim et al. | |
| 2010/0124693 | A1* | 5/2010 | Kosugi | G01R 31/3644 429/92 |
| 2011/0101920 | A1* | 5/2011 | Seo | B60L 11/1861 320/127 |
| 2012/0315519 | A1* | 12/2012 | Jin | H01M 10/625 429/72 |
| 2012/0328918 | A1 | 12/2012 | Kim | |
| 2013/0071706 | A1 | 3/2013 | Lee | |
| 2013/0200700 | A1* | 8/2013 | Ohkura | H01M 2/206 307/10.7 |
| 2013/0302651 | A1* | 11/2013 | Kim | H05K 1/148 429/7 |
| 2014/0335378 | A1* | 11/2014 | Kuroda | H01M 2/206 429/7 |

FOREIGN PATENT DOCUMENTS

| CN | 103390742 A | 11/2013 |
| JP | 2013152917 | 8/2013 |

* cited by examiner

*Primary Examiner* — Samuel Berhanu
(74) *Attorney, Agent, or Firm* — David Kelley; Carlson, Gaskey & Olds, P.C.

(57) ABSTRACT

An exemplary electrified vehicle busbar assembly includes a housing, a clamping beam held by the housing, and a plurality of busbars held by the housing.

19 Claims, 5 Drawing Sheets

ELECTRIFIED VEHICLE BUSBAR ASSEMBLY

TECHNICAL FIELD

This disclosure relates to a battery pack for an electrified vehicle and, more particularly, to a busbar assembly of the battery pack that secures cells of the battery pack.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery packs of electrified vehicles include battery cells within one or more arrays. The battery cells are secured relative to other components of the battery pack.

SUMMARY

An electrified vehicle busbar assembly according to an exemplary aspect of the present disclosure includes, among other things, a housing, a clamping beam held by the housing, and a plurality of busbars held by the housing.

In a further non-limiting embodiment of the foregoing assembly, the clamping beam is securable to an end wall of a battery pack.

In a further non-limiting embodiment of any of the foregoing assemblies, the clamping beam biases a plurality of battery cells toward a heat exchanger plate when the clamping beam is secured to the end wall.

In a further non-limiting embodiment of any of the foregoing assemblies, the clamping beam is weldably securable to the end wall.

In a further non-limiting embodiment of any of the foregoing assemblies, the clamping beam is securable to the end wall via a mechanical fastener.

In a further non-limiting embodiment of any of the foregoing assemblies, the mechanical fastener locates the clamping beam within the battery pack.

In a further non-limiting embodiment of any of the foregoing assemblies, locating the clamping beam locates the plurality of busbars.

In a further non-limiting embodiment of any of the foregoing assemblies, the clamping beam is positioned at a median of a battery pack.

In a further non-limiting embodiment of any of the foregoing assemblies, the housing electrically isolates the clamping beam from the plurality of busbars and from a plurality of battery cells.

In a further non-limiting embodiment of any of the foregoing assemblies, the clamping beam extends longitudinally from a first end to a second end that is opposite the first end. The first end is securable to a first end wall of a battery pack. The second end is securable to a second end wall of the battery pack.

In a further non-limiting embodiment of any of the foregoing assemblies, the assembly further includes thermistors, sense leads, or both secured to the housing.

A method of biasing battery cells of a battery pack according to an exemplary aspect of the present disclosure includes, among other things, securing a clamping beam to at least one end wall of a battery pack to bias a plurality of battery cells against a heat exchanger plate, holding the clamping beam within a housing, and holding a plurality of busbars within the housing.

In a further non-limiting embodiment of the foregoing method, the method includes locating the plurality of busbars relative to the plurality of battery cells during the securing.

In a further non-limiting embodiment of any of the foregoing methods, the method includes securing using a mechanical fastener.

In a further non-limiting embodiment of any of the foregoing methods, the method includes using the mechanical fastener to locate the plurality of busbars relative to the plurality of battery cells during the securing.

In a further non-limiting embodiment of any of the foregoing methods, the method includes securing by welding the clamping beam to the at least one end wall.

In a further non-limiting embodiment of any of the foregoing methods, the clamping beam extends longitudinally from a first end to a second end opposite the first end, and the securing further comprises securing the first end to a first end wall and securing the second end to a second end wall.

In a further non-limiting embodiment of any of the foregoing methods, the method includes using the housing to electrically isolate the clamping beam from the plurality of busbars and from the plurality of the battery cells.

In a further non-limiting embodiment of any of the foregoing methods, the method includes securing the busbars to terminals of the battery cells.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a battery pack for an electrified vehicle. In particular, the disclosure relates to biasing cells of the battery pack using a busbar assembly. The busbar assembly incorporates a clamping beam to help hold the cells.

Figure 1:
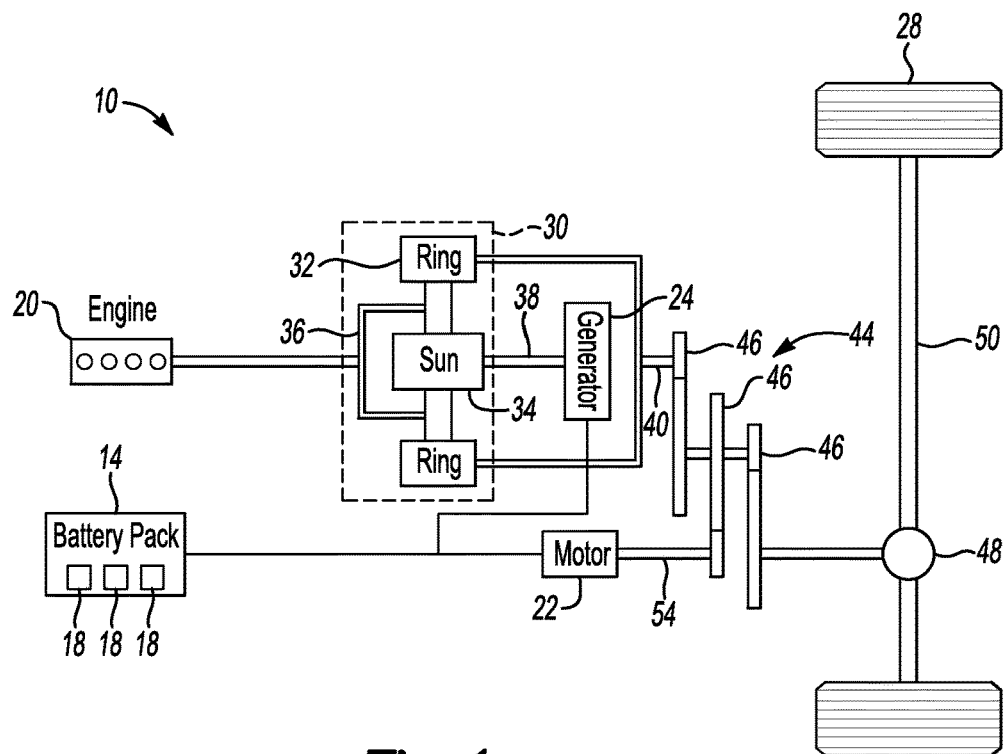
FIG. 1 illustrates a schematic view of a powertrain for an electrified vehicle.

Referring to FIG. 1, a powertrain 10 of a hybrid electric vehicle (HEV) includes a battery pack 14 having a plurality of arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
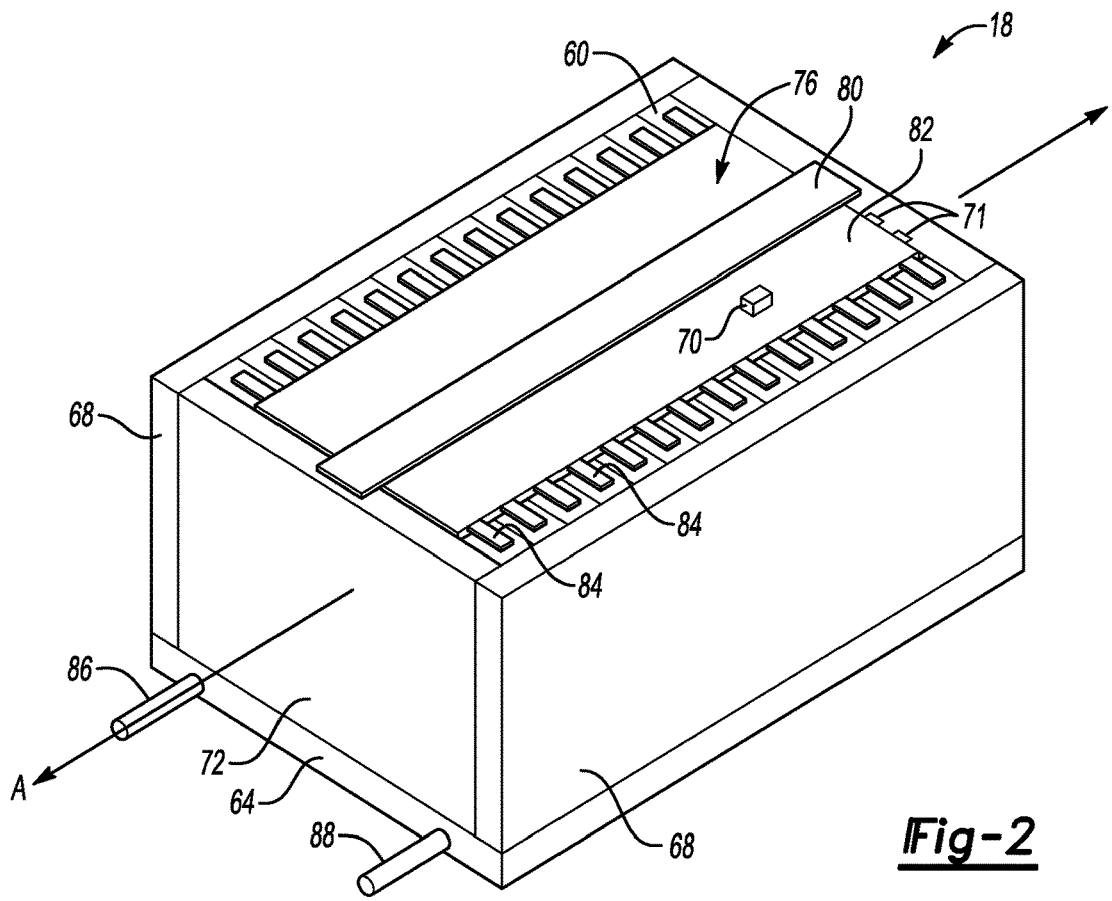
FIG. 2 illustrates a perspective, schematic view of a battery pack from the powertrain of FIG. 1.
Figure 3:
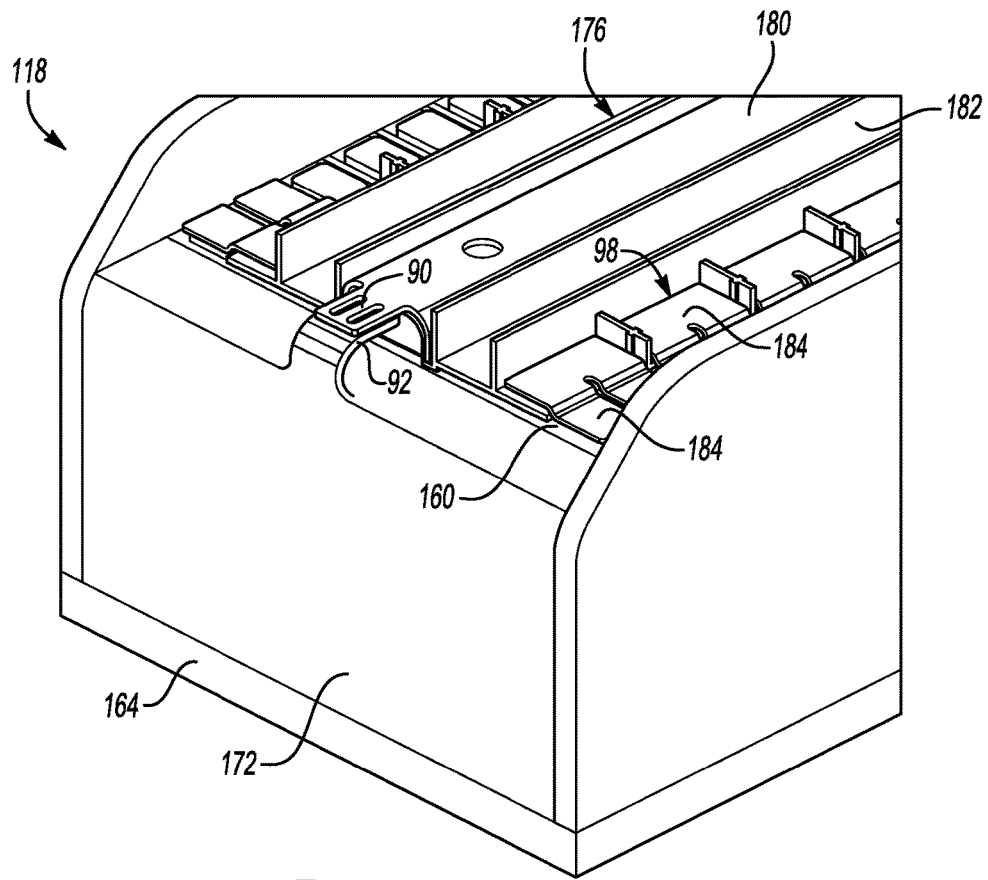
FIG. 3 illustrates a perspective, close-up view of an end of another example battery pack for use with the powertrain of FIG. 1.
Figure 5:
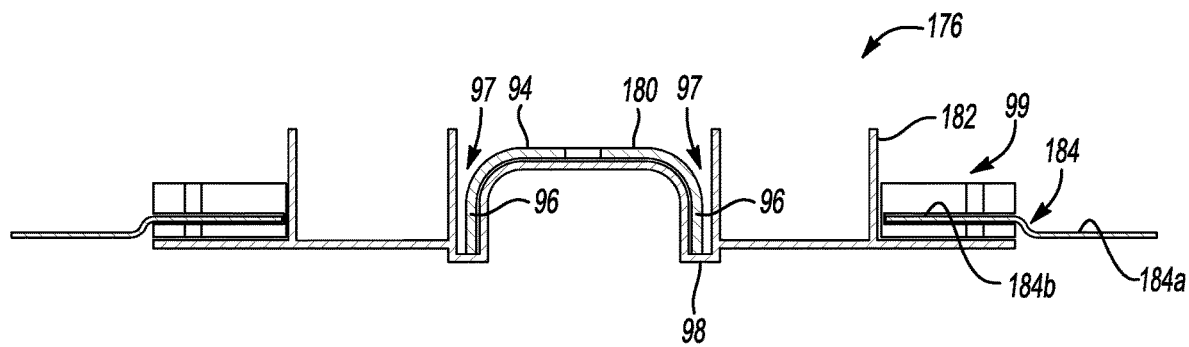
FIG. 5 illustrates a section view at Line 5-5 in FIG. 4.
Figure 4:
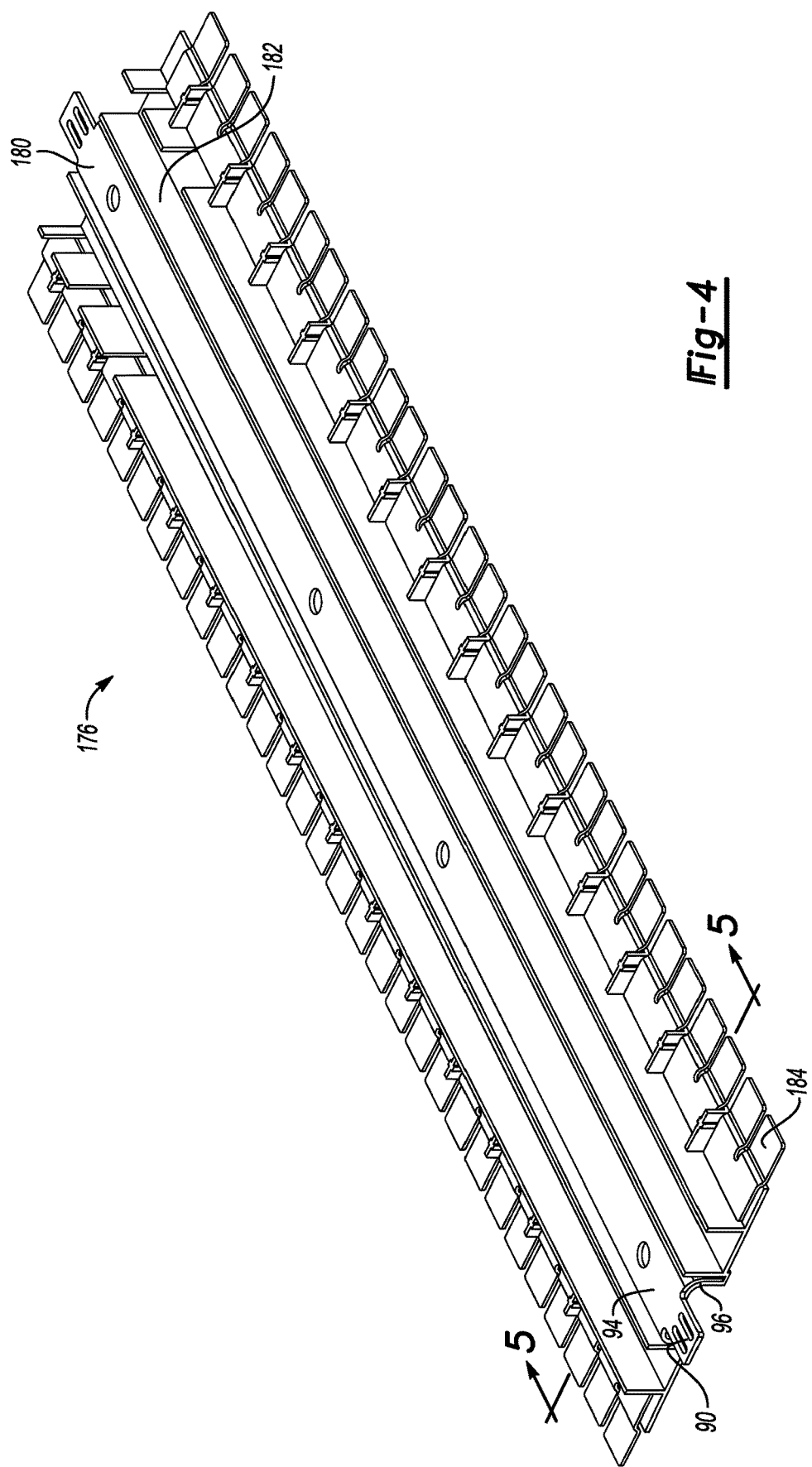
FIG. 4 illustrates a perspective view of a busbar assembly from the battery pack of FIG. 3.
Figure 6:
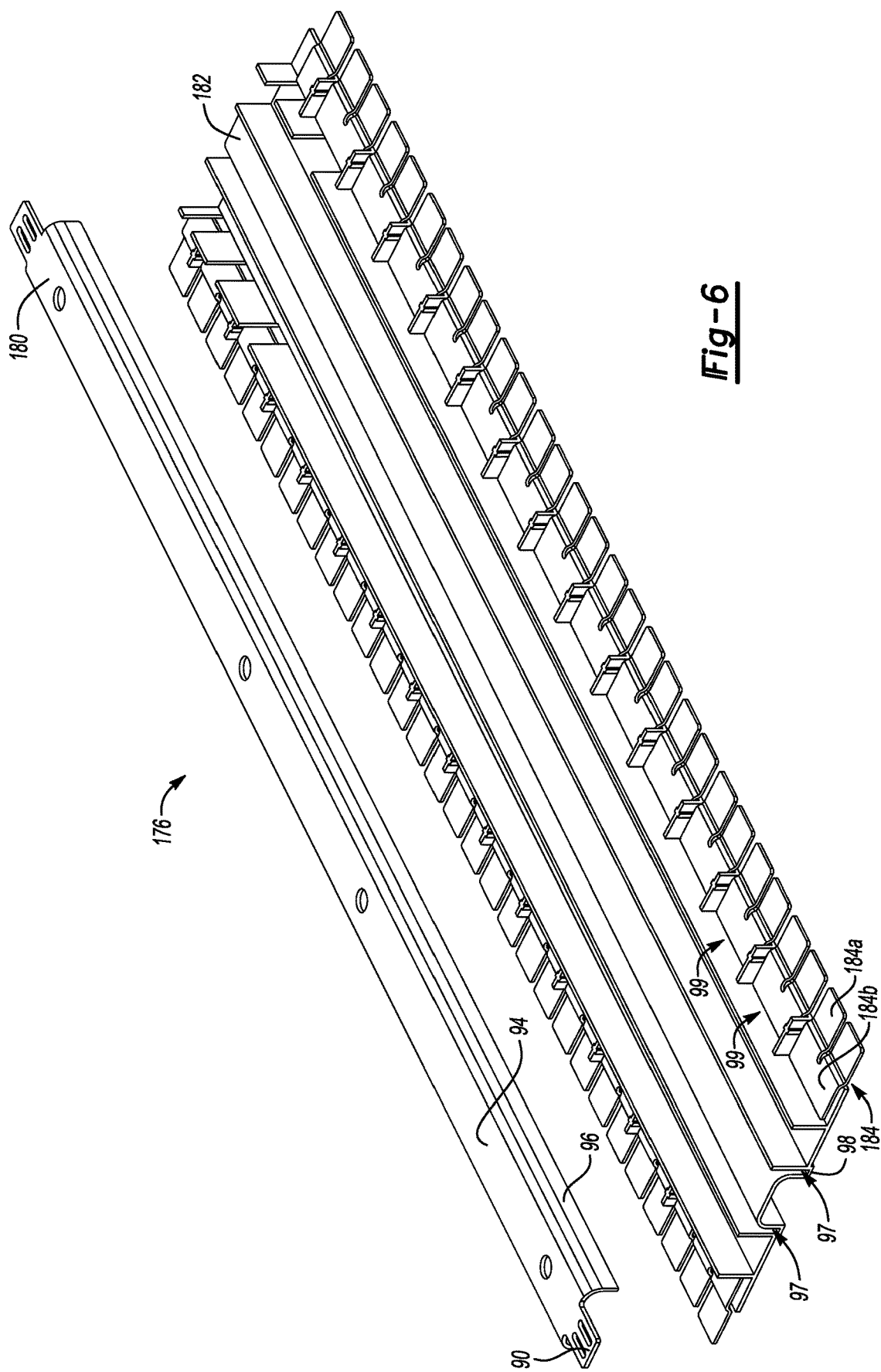
FIG. 6 illustrates an exploded view of the busbar assembly of FIG. 4.
Figure 7:
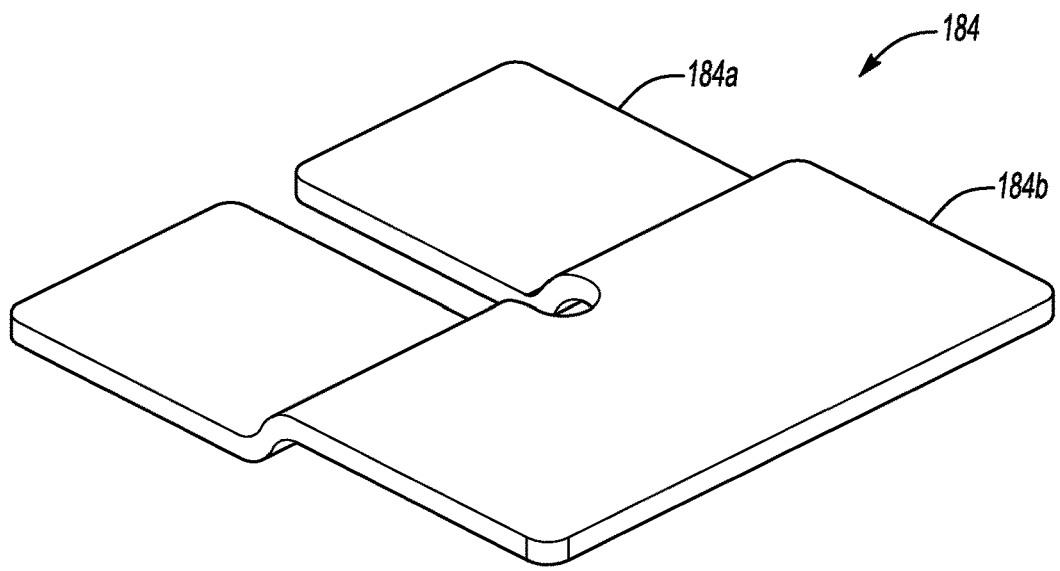
FIG. 7 illustrates a busbar from the busbar assembly of FIG. 4.

Referring now to FIG. 2 with continuing reference to FIG. 1, the example battery pack 14 includes one or more arrays 18. The arrays 18 include a plurality of battery cells 60 disposed on a heat exchanger plate 64. The cells 60 of an array 18 can be disposed along an axis A.

The array includes fourteen battery cells 60 in this example. The array 18 could include other numbers of cells 60 in other examples. The battery pack 14 could also include additional arrays 18.

The cells 60 are positioned laterally between a pair of sidewalls 68. The cells 60 are positioned, and clamped, axially between a pair of end walls 72.

A busbar assembly 76 is positioned atop the cells 60 and aligned with a median of the array 18. The busbar assembly 76 includes a clamping beam 80, a housing 82, and a plurality of busbars 84. The clamping beam 80 is aligned with the median of the array 18 in this example. In other examples, the busbar assembly 76, the clamping beam 80, or both are positioned atop the cells 60 and are not aligned with the median.

The busbars 84 attach to terminals of the cells 60. Electrical energy communicates to and from the cells 60 through the busbars 84 attached to the terminals.

Since the clamping beam 80, housing 82, and the busbars 84 move together as part of the same busbar assembly 76, locating a portion of the busbar assembly 76 can locate other portions of the busbar assembly 76. For example, the clamping beam 80 could be located during assembly. When the clamping beam 80 is appropriately aligned, the busbars 84 are also aligned. Locating the clamping beam 80 can thus eliminate the need to locate each of the busbars 84 relative to the cells 60.

Opposing axial ends of the clamping beam 80 are secured to the end walls 72. Securing the clamping beam 80 to the end walls 72 draws the busbar assembly 84 downward to contact the cells and biases the cells 60 toward the heat exchanger plate 64. Biasing the cells 60 toward the heat exchanger plate 64 ensures contact between the downwardly facing surfaces of the cells 60 and the heat exchanger plate 64.

Notably, in this example embodiment, the biasing of the cells 60 is accomplished through the busbar assembly 76 and, in this example, does not utilize the sidewalls 68 or other structures of the array 18 to clamp the cells 60 against the heat exchanger plate 64. Eliminating clamping features from the sidewalls 68 can desirably reduce a packaging footprint of the battery pack 14.

Further, the array 18 may include one or more thermistors 70. Applying a clamping force at the median of the array 18 positions the clamping force near the thermistors 70, which can enhance readings from the thermistors 70. The busbar assembly 76 can include the thermistors 70 in some examples. The busbar assembly 76, or another portion of the array 18, could include sense leads 71 (wires) that would benefit from enhanced contact with the cells 60.

The example array 18 is cooled via liquid coolant communicated through the heat exchanger plate 64. Liquid coolant moves through an inlet 86 to a coolant path established within the heat exchanger plate 64. The liquid coolant moves through the coolant path to exchange thermal energy with the cells 60 and other portions of the battery pack 14. The liquid coolant exits from the heat exchanger plate 64 at an outlet 88. The liquid coolant is used to cool the cells 60 in this example. In another example, the liquid coolant could be used to heat the cells 60.

Referring now to FIGS. 3 to 7, in the example array 118, the clamping beam 180 of the busbar assembly 176 is secured to the end walls 172 via a welding operation. The welding operation may be made in either the horizontal or vertical directions depending on the functional needs of the clamping beam 80.

In this example, to secure the busbar assembly 176, a tab 90 of the clamping beam 180 is pressed against a tab 92 extending from the end walls 172. The tab 90 of the clamping beam 180 is then welded to the tab 92 of the end walls 172 with spot welds, for example.

A fixture (not shown) can be used to locate the tab 90 relative to the tab 92 prior to, and during, the welding operation. Notably, locating the tab 90 relative to the tab 92 locates the busbars 184 relative to the cells 160.

The clamping beam 180 includes a base 94 and walls 96 extending from opposing lateral sides of the base 94. The clamping beam 180 has a C-shaped cross-sectional profile.

The clamping beam 180 profile can provide a path for venting the cells 160 in some examples.

In some examples, the clamping beam 180 may include a rib, divot, or depression extending longitudinally within the base 94 to enhance the structural integrity of the clamping beam 80.

The housing 182 of the busbar assembly 176 includes channels 97 that receive the walls 96 of the clamping beam 180. The channels 97 terminate at a floor 98 of the housing 182.

When the walls 96 of the clamping beam 180 are received within the channels 97, the floor 98 is positioned between the walls 96 and an upper surface of the cells 160. The floor 98 electrically isolates the clamping beam 180, which may be a metallic material, from the cells 160. The housing 182 can be molded of a polymer material, for example.

The laterally outboard portions of the housing 182 include channels 99 that receive busbars 184. The busbar assembly 176 can include snap tabs or other molded in features to hold the busbars 184 within the channels 99.

In this example, the channels 99 hold a portion 184b of the busbars 184. Another portion 184a of the busbars 184 extends laterally outside the channels 99. The portions 184a are configured to interface directly with terminals of cells 160 of the array 118.

The housing 182 electrically isolates the busbars 184 from the clamping beam 180. The housing 182 further electrically isolates the cells 160 from the clamping beam 180. The housing 182 can still further electrically isolate the clamping beam 180 from other components of the array 118, which are at HV bus potential. The other components could include cases associated with the cells 160, for example, which are electrically connected to the terminals of the cells 160.

The clamping beam 180, the housing 182, and the busbars 184 move together as the busbar assembly 176. As the busbars 184 and clamping beam 180 are attached to the housing 182, the busbars 184 move as the tab 90 of the clamping beam 180 is positioned relative to the tab 92 of the end walls 172.

In this example, the housing 182 is designed such that locating the tab 90 of the clamping beam 180 relative to the tab 92 of the end walls 172 positions the portions 184a of the busbars 184 over the terminals of the cells 160. Thus, the busbars 184 are located by locating the tab 90 of the clamping beam 180 relative to the tab 92 of the end walls 172.

When the busbars 184 are positioned relative to the terminals of the cells 160, the busbars 184 can then be secured to the terminals. The portions 184a of the busbars 184 can be, for example, welded to the terminals contemporaneously with welding the clamping beam 180 to the end walls 172. In another example, the welding of the portions 184a is separate from the welding of the clamping beam 180.

Welding the clamping beam 180 clamps the busbar assembly 176 against the cells 160 and biases the cells 160 toward the heat exchanger plate 164.

Figure 8:
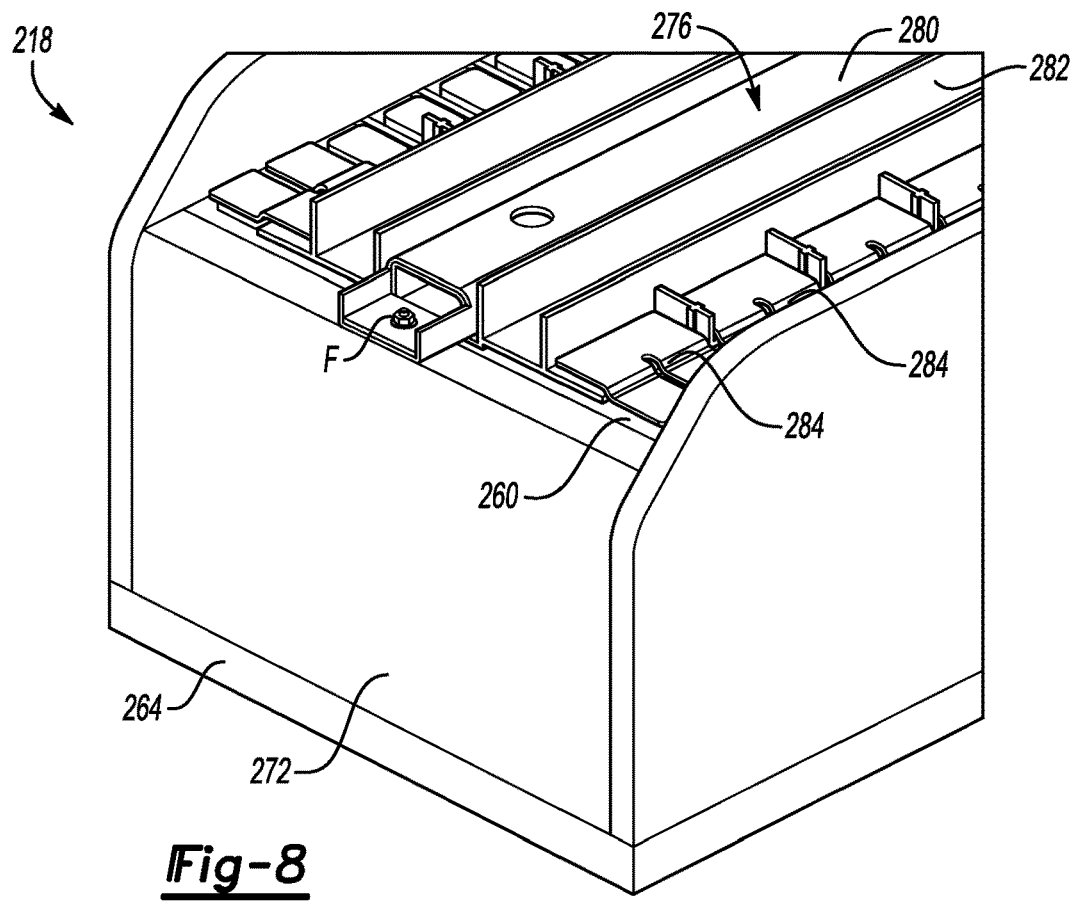
FIG. 8 illustrates a selected portion of another example battery pack for use with the powertrain of FIG. 1.

Referring to FIG. 8, another example array 218 includes the busbar assembly 276 secured to end walls 272 with a mechanical fastener F, rather than by welding.

The mechanical fastener F may be a threaded fastener. Tightening the mechanical fastener F moves the clamping beam 280 downward against the cells 260 to urge or bias the cells 260 toward a heat exchanger plate 264.

The mechanical fastener 132 helps to locate the clamping beam 280 and the remaining portions of the busbar assembly 276.

Features of some of the disclosed examples include holding cells within an array using a busbar assembly, and without requiring a flange extending from a sidewall to hold the cells. This approach can, among other things, reduce the lateral packaging footprint of the battery pack.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An electrified vehicle busbar assembly, comprising:
a housing;
a clamping beam held by the housing; and
a plurality of busbars held by the housing, wherein the housing, the clamping beam, and the plurality of busbars are moveable together as a busbar assembly, wherein the housing electrically isolates the clamping beam from the plurality of busbars and from a plurality of battery cells.

2. The assembly of claim 1, further comprising an end wall of a battery pack, wherein the clamping beam is secured directly to the end wall to secure the housing and the plurality of busbars relative to the end wall.

3. The assembly of claim 1, wherein the clamping beam biases a plurality of battery cells toward a heat exchanger plate when the clamping beam is secured to an end wall, the plurality of battery cells distributed along an axis, the biasing in a direction transverse to the axis.

4. The assembly of claim 2, wherein the clamping beam is weldably securable to the end wall.

5. The assembly of claim 2, wherein the clamping beam is securable to the end wall via a mechanical fastener.

6. The assembly of claim 5, wherein the mechanical fastener locates the clamping beam within the battery pack, and directly secures the clamping beam to the end wall such that a portion of the clamping beam is clamped between the mechanical fastener and the end wall.

7. The assembly of claim 6, wherein locating the clamping beam locates the plurality of busbars.

8. The assembly of claim 1, wherein the clamping beam is positioned at a median of a battery pack.

9. The assembly of claim 1, wherein the clamping beam extends longitudinally from a first end to a second end opposite the first end, the first end securable to a first end wall of a battery pack, the second end securable to a second end wall of the battery pack.

10. The assembly of claim 1, further including thermistors, sense leads, or both secured to the housing.

11. A method of biasing battery cells of a battery pack, comprising:
securing a clamping beam to at least one end wall of a battery pack to bias a plurality of battery cells against a heat exchanger plate;
holding the clamping beam within a housing; and
holding a plurality of busbars within the housing.

12. The method of claim 11, further comprising locating the plurality of busbars relative to the plurality of battery cells during the securing.

13. The method of claim 11, further comprising securing using a mechanical fastener, and securing the clamping beam to the end wall such that a portion of the clamping beam is clamped between the mechanical fastener and the end wall.

14. The method of claim 13, using the mechanical fastener to locate the plurality of busbars relative to the plurality of battery cells during the securing.

15. The method of claim 11, further comprising securing by welding the clamping beam to the at least one end wall.

16. The method of claim 11, wherein the clamping beam extends longitudinally from a first end to a second end opposite the first end, and the securing further comprises securing the first end to a first end wall and securing the second end to a second end wall.

17. The method of claim 11, further comprising using the housing to electrically isolate the clamping beam from the plurality of busbars and from the plurality of the battery cells.

18. An electrified vehicle busbar assembly, comprising:
   a housing;
   a clamping beam held by the housing; and
   a plurality of busbars held by the housing, wherein the housing, the clamping beam, and the plurality of busbars are moveable together as a busbar assembly, wherein the housing directly contacts the clamping beam.

19. The method of claim 11, wherein the plurality of battery cells distributed along an axis, the biasing in a direction transverse to the axis.

* * * * *